US011054499B2

(12) United States Patent
Murali et al.

(10) Patent No.: US 11,054,499 B2
(45) Date of Patent: Jul. 6, 2021

(54) DIGITAL COMPENSATION FOR MISMATCHES IN A RADAR SYSTEM

(71) Applicant: Texas Instruments Incorporated, Dallas, TX (US)

(72) Inventors: Sriram Murali, Bangalore (IN); Karthik Subburaj, Bangalore (IN); Karthik Ramasubramanian, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1298 days.

(21) Appl. No.: 15/004,443

(22) Filed: Jan. 22, 2016

(65) Prior Publication Data
US 2017/0212214 A1 Jul. 27, 2017

(51) Int. Cl.
*G01S 7/35* (2006.01)
*G01S 7/40* (2006.01)
*G01S 13/931* (2020.01)

(52) U.S. Cl.
CPC ............ *G01S 7/352* (2013.01); *G01S 7/4021* (2013.01); *G01S 13/931* (2013.01); *G01S 2007/358* (2013.01); *G01S 2007/406* (2013.01)

(58) Field of Classification Search
CPC ...... G01S 7/352; G01S 7/4021; G01S 13/931; G01S 2007/358; G01S 2007/406
USPC ........................................................ 342/194
See application file for complete search history.

(56) References Cited

U.S. PATENT DOCUMENTS

| 6,337,888 | B1* | 1/2002 | Huang ............... G01S 7/288 375/322 |
| 7,504,990 | B2* | 3/2009 | Isaji .................. G01S 7/35 342/107 |
| 7,782,235 | B1* | 8/2010 | Velazquez ......... H03M 1/1052 341/118 |
| 7,876,261 | B1* | 1/2011 | Adams ............... G01S 7/4008 342/88 |
| 8,358,997 | B2* | 1/2013 | Mo .................... H04B 1/30 455/306 |
| 8,416,121 | B2* | 4/2013 | Chen .................. G01S 13/584 342/70 |
| 2005/0123067 | A1* | 6/2005 | Kim ................... H03D 3/009 375/298 |

(Continued)

OTHER PUBLICATIONS

M.L. Lees, "Digital Beamforming Calibration for FMCW Radar", IEEE Transactions on Aerospace and Electronic Systems, vol. AES-25, No. 2, Mar. 1989, pp. 281-284.

*Primary Examiner* — Peter M Bythrow
*Assistant Examiner* — Nuzhat Pervin
(74) *Attorney, Agent, or Firm* — Ronald O. Neerings; Charles A. Brill; Frank D. Cimino

(57) ABSTRACT

A radar system is provided that includes a receive channel configured to receive a reflected signal and to generate a first digital intermediate frequency (IF) signal based on the reflected signal, a reference receive channel configured to receive a reflected signal and to generate a second digital IF signal based on the reflected signal, and digital mismatch compensation circuitry coupled to receive the first digital IF signal and the second digital IF signal, the digital mismatch compensation circuitry configured to process the first digital IF signal and the second digital IF signal to compensate for mismatches between the receive channel and the reference receive channel.

26 Claims, 7 Drawing Sheets

(56) References Cited

U.S. PATENT DOCUMENTS

| | | | |
|---|---|---|---|
| 2007/0218854 A1* | 9/2007 | Lawrence | H04B 1/28 455/310 |
| 2008/0207146 A1* | 8/2008 | Marath | H04B 1/123 455/114.2 |
| 2008/0231501 A1* | 9/2008 | Isaji | G01S 7/35 342/195 |
| 2009/0253385 A1* | 10/2009 | Dent | H04B 1/0458 455/83 |
| 2010/0261442 A1* | 10/2010 | Paculdo | H04B 1/0458 455/110 |
| 2011/0158297 A1* | 6/2011 | Ding | H04B 1/40 375/219 |
| 2011/0222631 A1* | 9/2011 | Jong | H04L 27/3863 375/316 |
| 2011/0312292 A1* | 12/2011 | Mo | H04B 1/30 455/226.1 |
| 2012/0146845 A1* | 6/2012 | Chen | G01S 13/584 342/200 |
| 2012/0213263 A1* | 8/2012 | Norris | H04B 1/0458 375/224 |
| 2013/0016003 A1* | 1/2013 | Stirling-Gallacher | G01S 13/89 342/174 |
| 2015/0208945 A1* | 7/2015 | Lux | A61B 5/113 600/430 |
| 2015/0276918 A1* | 10/2015 | Ramasubramanian | G01S 7/35 342/107 |
| 2015/0288440 A1* | 10/2015 | Imao | H04B 7/08 375/347 |
| 2017/0019128 A1* | 1/2017 | Pack | H04B 1/10 |
| 2017/0019190 A1* | 1/2017 | Pack | H03F 3/24 |
| 2017/0019191 A1* | 1/2017 | Brannon | H04B 15/00 |
| 2017/0019235 A1* | 1/2017 | Brannon | H04B 1/713 |
| 2017/0019240 A1* | 1/2017 | Pack | H04L 5/1461 |
| 2017/0019272 A1* | 1/2017 | Brannon | H04B 15/00 |

* cited by examiner

DIGITAL COMPENSATION FOR MISMATCHES IN A RADAR SYSTEM

BACKGROUND OF THE DISCLOSURE

Field of the Disclosure

Embodiments of the present disclosure generally relate to radar systems, and more specifically relate to digital compensation for routing delay mismatches and intermediate frequency (IF) filter response mismatches in radar systems.

Description of the Related Art

The use of embedded radar systems in industrial and automotive applications is evolving rapidly. For example, embedded radar systems may be used in a number of applications associated with a vehicle such as adaptive cruise control, collision warning, blind spot warning, lane change assist, parking assist and rear collision warning. Further, embedded radar systems may be used in industrial or security applications such as tracking movement inside a house or building under surveillance and maneuvering a robot in a factory or warehouse. In such usages, accuracy of object detection and tracking is important.

SUMMARY

Embodiments of the present disclosure relate to methods and apparatus for digital compensation of mismatched in a radar system. In one aspect, a radar system is provided that includes a receive channel configured to receive a reflected signal and to generate a first digital intermediate frequency (IF) signal based on the reflected signal, a reference receive channel configured to receive a reflected signal and to generate a second digital IF signal based on the reflected signal, and digital mismatch compensation circuitry coupled to receive the first digital IF signal and the second digital IF signal, the digital mismatch compensation circuitry configured to process the first digital IF signal and the second digital IF signal to compensate for mismatches between the receive channel and the reference receive channel.

In one aspect, a method of operation of a radar system is provided that includes receiving a reflected signal in a receive channel of the radar system and generating a first digital intermediate frequency (IF) signal based on the reflected signal, receiving a reflected signal in a reference receive channel of the radar system and generating a second digital IF signal based on the reflected signal, and processing the first digital IF signal and the second digital IF signal by digital mismatch compensation circuitry of the radar system to compensate for mismatches between the receive channel and the reference receive channel.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
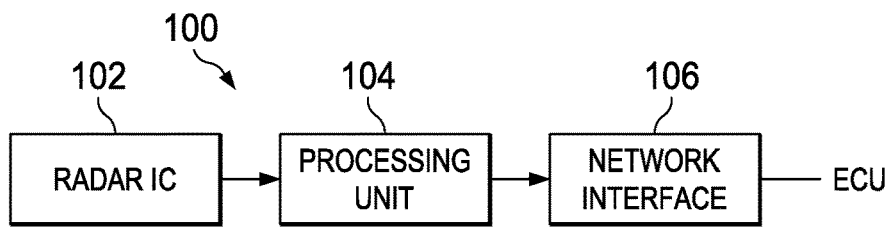
FIGS. 1, 2, and 3 are block diagrams of an example Frequency Modulated Continuous Wave (FMCW) radar system.

Specific embodiments of the disclosure will now be described in detail with reference to the accompanying figures. Like elements in the various figures are denoted by like reference numerals for consistency.

In Frequency Modulated Continuous Wave (FMCW) radar systems with multiple receive channels and multiple transmit channels, differences in radio frequency (RF) trace lengths in the receive channels and the transmit channels can cause routing delay mismatches that lead to errors in beamforming and in object angle estimation performed using digital signal data from the receive channels. In FMCW radar systems, differences in RF trace lengths are equivalent to differences in intermediate frequency (IF) offsets. Thus, frequency shifting can be used to compensate for the different routing delays between transmit channels and between receive channels caused by the trace length differences. Some approaches for using frequency shifting to correct routing delay mismatches between transmit channels and between receive channels are described in United States Patent Publication No. 2015/0276918, filed Mar. 3, 2015, which is incorporated by reference herein.

In some embodiments of the disclosure, digital frequency shifting is implemented in the digital baseband of a radar system to compensate for routing delay mismatches between receive channels. The use of digital frequency shifting to compensate for routing delay mismatches between the receive channels removes the differences in the IF offsets but does not correct for any intermediate frequency (IF) filtering mismatches, i.e., mismatches in the analog baseband filter responses experienced by the IF signals in the receive channels because of the different IF frequency offsets. In some embodiments, digital compensation filters, which may be referred to as IF response mismatch compensation filters herein, are applied in addition to the digital frequency shifting to correct the IF filter response mismatches. In some embodiments, digital matching filters, which may be referred to as IQ matching filters herein, are employed before the routing delay IF response mismatch compensation to compensate for mismatches of the in-phase (I) and quadrature (Q) arms of filters in the analog basebands in each receive channel. In some embodiments, self-calibration of parameters for the digital frequency shifting and/or digital IF response mismatch compensation filters and/or digital IQ matching filters is also provided.

Figure 2:
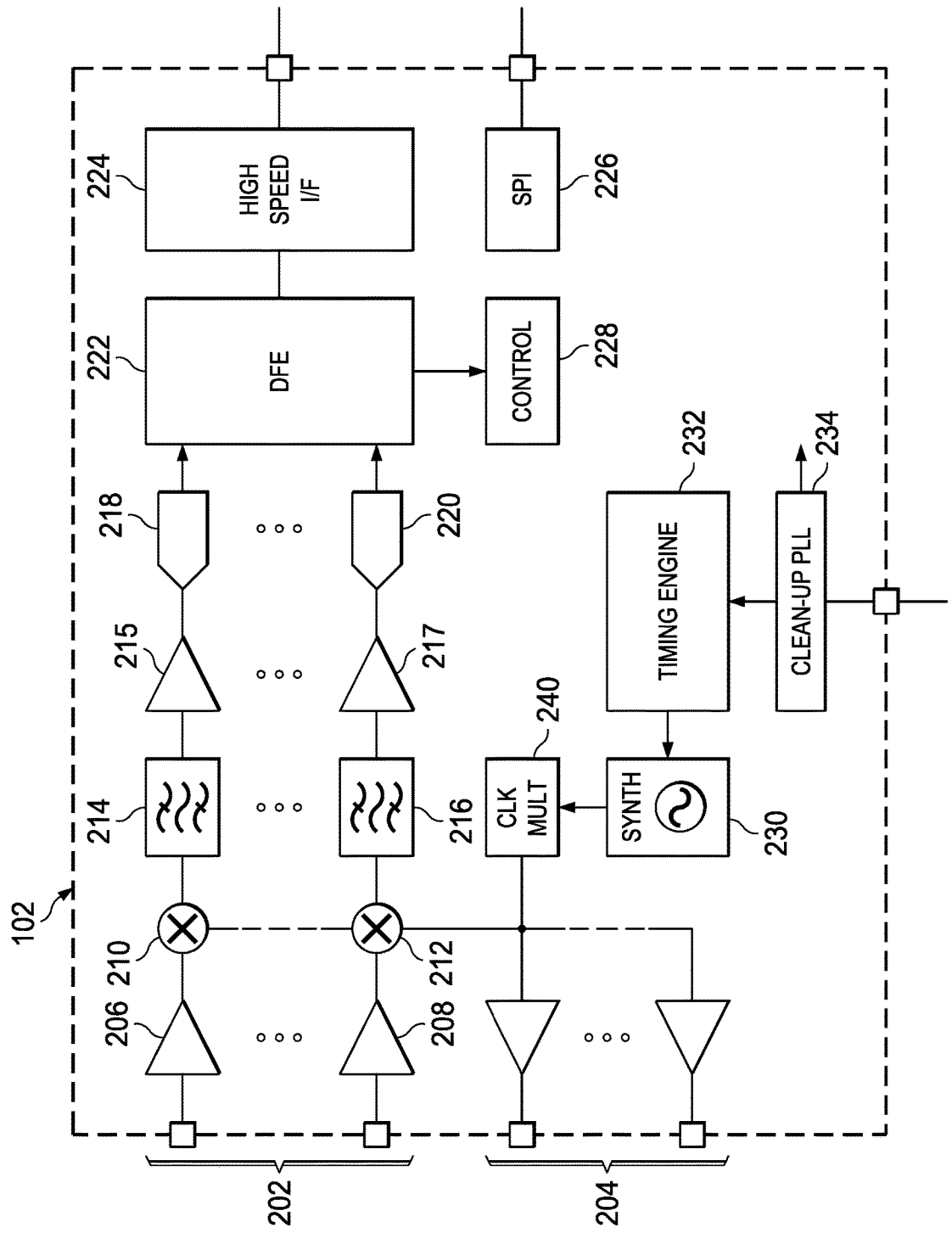
Figure 3:
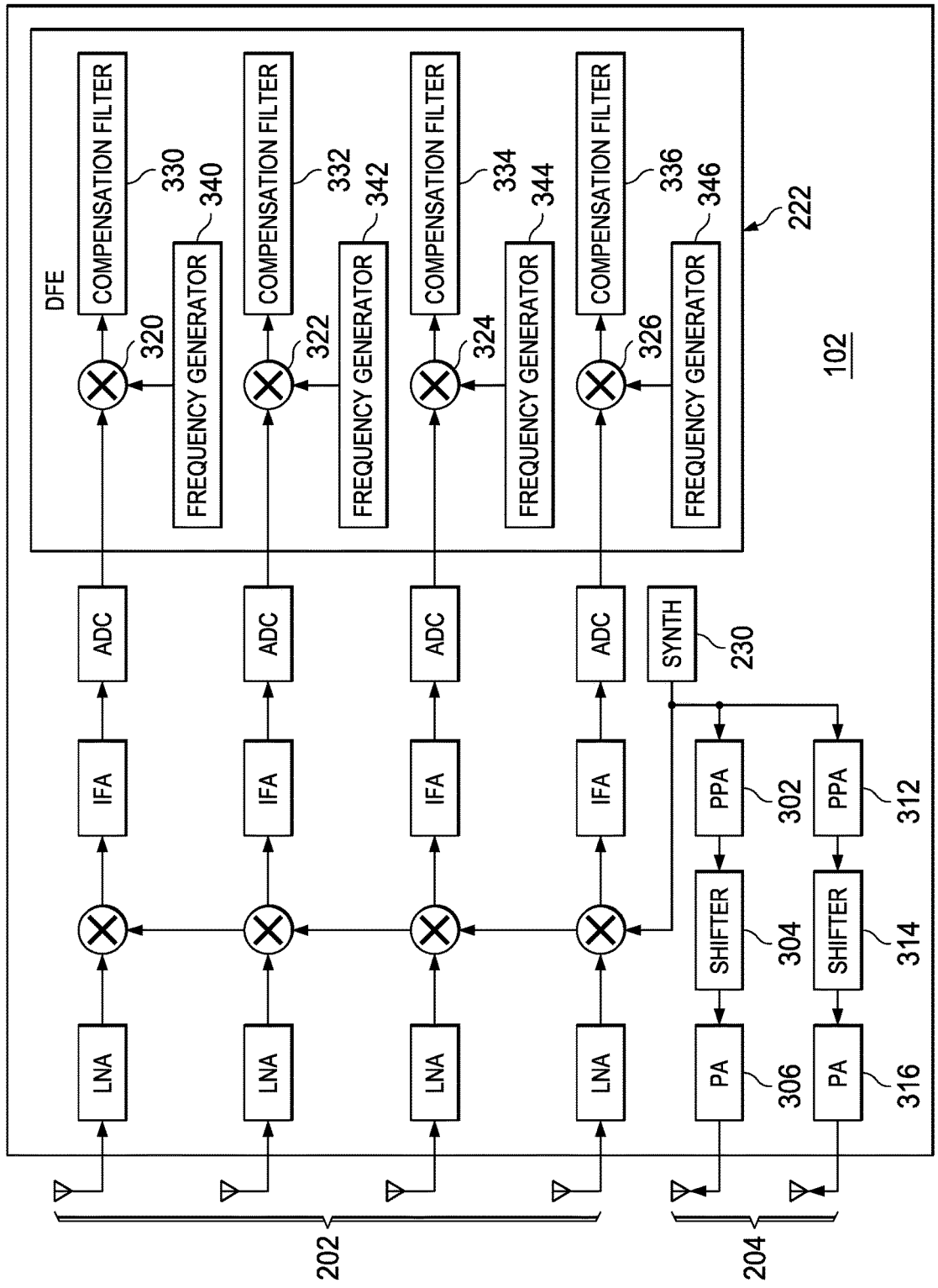

FIGS. 1, 2, and 3 are block diagrams of an example FMCW radar system 100 configured to perform digital compensation for routing delay mismatches between receive channels and to perform automatic calibration of parameter values used for the digital compensation. FIG. 1 illustrates the top level architecture of the radar system 100, FIG. 2 illustrates an example FMCW radar transceiver integrated circuit (IC) suitable for use in the radar system 100, and FIG. 3 provides a more detailed view of the configuration of the radar transceiver IC for digital correction of routing delay mismatches and automatic calibration of the parameter values used by the digital correction.

Referring now to FIG. 1, the example FMCW radar system 100 illustrated is suitable for use in an embedded application such as in a vehicle. The radar system 100 includes a radar transceiver IC 102, a processing unit 104, and a network interface 106. The radar transceiver IC 102 is coupled to the processing unit 104 via a high speed serial interface. As is explained in more detail in reference to FIG. 2, the radar transceiver IC 102 includes functionality to generate multiple digital intermediate frequency (IF) signals (alternatively referred to as dechirped signals, beat signals, or raw radar signals) that are provided to the processing unit 104 via the high speed serial interface.

The processing unit 104 includes functionality to perform radar signal processing, i.e., to process the received radar signals to determine, for example, distance, velocity, and angle of any detected objects. The processing unit 104 may also include functionality to perform post processing of the information about the detected objects, such as tracking objects, determining rate and direction of movement, etc.

The processing unit 104 may include any suitable processor or combination of processors as needed for the processing throughput of the application using the radar data. For example, the processing unit 104 may include a digital signal processor (DSP), a microcontroller (MCU), an SOC combining both DSP and MCU processing, or a field programmable gate array (FPGA) and a DSP.

The processing unit 104 provides control information as needed to one or more electronic control units in the vehicle via the network interface 106. Electronic control unit (ECU) is a generic term for any embedded system in a vehicle that controls one or more the electrical system or subsystems in the vehicle. Types of ECU include, for example, electronic/engine control module (ECM), powertrain control module (PCM), transmission control module (TCM), brake control module (BCM or EBCM), central control module (CCM), central timing module (CTM), general electronic module (GEM), body control module (BCM), and suspension control module (SCM).

The network interface 106 may implement any suitable protocol, such as, for example, the controller area network (CAN) protocol, the FlexRay protocol, or Ethernet protocol.

Referring now to FIG. 2, the radar transceiver IC 102 may include multiple transmit channels 204 for transmitting FMCW signals and multiple receive channels 202 for receiving the reflected transmitted signals. Any suitable number of receive channels and transmit channels may be used in embodiments. Further, the number of receive channels and the number of transmit channels may not be the same. For example, an embodiment of the radar transceiver IC 102 may have two transmit channels and four receive channels.

A transmit channel includes a suitable transmitter and antenna. A receive channel includes a suitable receiver and antenna. Further, each of the receive channels 202 are identical and include a low-noise amplifier (LNA) 206, 208 to amplify the received radio frequency (RF) signal, a mixer 210, 212 to mix the transmitted, i.e., local oscillator (LO), signal with the received RF signal to generate an intermediate frequency (IF) signal, a baseband bandpass filter 214, 216 for filtering the IF signal, a variable gain amplifier (VGA) 215, 217 for amplifying the filtered IF signal, and an analog-to-digital converter (ADC) 218, 220 for converting the analog IF signal to a digital IF signal. The bandpass filter, VGA, and ADC of a receive channel may be collectively referred to as the analog baseband, the baseband chain or the baseband filter chain. Further, the bandpass filter and VGA may be collectively referred to as an IF amplifier (IFA). In addition, the bandpass filter may be referred to as the IF filter herein.

The receive channels 202 are coupled to the digital front end (DFE) component 222 to provide the digital IF signals to the DFE 222. The DFE 222, which may also be referred to as the digital baseband, may include functionality to perform decimation filtering on the digital IF signals to reduce the data transfer rate. The DFE 222 may also perform other operations on the digital IF signals, e.g., DC offset removal, digital compensation of non-idealities in the receive channels, such as inter-RX gain imbalance non-ideality, inter-RX phase imbalance non-ideality and the like.

As is described in more detail in reference to FIG. 3, in some embodiments, the DFE 222 also includes mismatch compensation circuitry to compensate for routing delay mismatches and IF filter response mismatches in the receive channels 202. As is described in more detail in reference to FIG. 6, in some embodiments, the mismatch compensation circuitry of the DFE 222 includes circuitry to correct mismatches between the in-phase (I) and quadrature (Q) channels of the IF filters in each receive channel. These mismatches may be referred to as IQ filter mismatches or IQ filter imbalances.

The DFE 222 is coupled to the high speed serial interface (I/F) 224 to transfer the digital IF signals (after processing in the DFE 222) to the processing unit 104 when the radar transceiver IC 102 is operated in normal mode. The DFE 222 is also coupled to the control module 228 to transfer digital calibration signals to the control module 228 when the radar transceiver IC 102 is operated in calibration mode.

The serial peripheral interface (SPI) 226 provides an interface for communication with the processing unit 104. For example, the processing unit 104 may use the SPI 226 to send control information, e.g., timing and frequencies of chirps, output power level, triggering of monitoring functions, etc., to the control module 228. The radar transceiver IC 102 may use the SPI 226, for example, to send test data to the processing unit 104.

The control module 228 includes functionality to control the operation of the radar transceiver IC 102 in normal mode and in calibration mode. The control module 228 may include, for example, a buffer to store output samples of the DFE 222, an FFT (Fast Fourier Transform) engine to compute spectral information of the buffer contents, and a microcontroller that executes firmware to control the operation of the radar transceiver IC 102. In some embodiments, the control module 228 includes functionality to determine parameter values for the mismatch compensation circuitry in the DFE 222 when the radar transceiver IC 102 is operated in calibration mode. Embodiments of the mismatch compensation circuitry of the DFE 222 are described in reference to FIG. 3 and FIG. 6 and operation of the control module 228 in calibration mode to determine the parameter values is described in reference to the method of FIGS. 7-10.

The programmable timing engine 232 includes functionality to receive chirp parameter values for a sequence of chirps in a radar frame from the control module 228 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (SYNTH) 230 includes functionality to generate FMCW signals for transmission based on chirp control signals from the timing engine 232. In some embodiments, the SYNTH 230 includes a phase locked loop (PLL) with a voltage controlled oscillator (VCO).

The clock multiplier 240 increases the frequency of the transmission signal (LO signal) to the LO frequency of the mixers 206, 208. The clean-up PLL (phase locked loop) 234 operates to increase the frequency of the signal of an external low frequency reference clock (not shown) to the frequency of the SYNTH 230 and to filter the reference clock phase noise out of the clock signal.

Referring now to FIG. 3, an embodiment of the radar transceiver IC 102 of FIG. 2 configured for compensation of routing delay mismatches and IF filter response mismatches of the receive channels 202 is illustrated. As is explained in more detail below, the digital compensation in the receive channels 202 is performed using circuitry in the DFE 222, i.e., the digital baseband. For simplicity of explanation, the depicted embodiment has four receive channels and two transmit channels. One of ordinary skill in the art will understand embodiments in which the number of receive channels and/or the number of transmit channels may differ.

The two transmit channels each incorporate a signal power amplifier chain of a pre-power amplifier (PPA) 302, 312 coupled to the SYNTH 230 to receive the FMCW signal, a programmable shifter 304, 314 coupled to the PPA 302, 312 to receive the amplified signal, and a power amplifier (PA) 306, 316 coupled to the shifter 304, 314 to receive the shifted signal. In some embodiments, the shifter 304, 314 may be programmed for both frequency and phase shifting. That is, the output signal of a shifter 304, 314 may have a frequency equal to the input frequency plus a programmable offset frequency and a phase equal to the input phase plus a programmable offset phase. A transmit antenna in each transmit channel is coupled to the respective PA 306, 316 to receive the amplified shifted signal for transmission.

In some embodiments, the radar transceiver IC 102 may be configured to correct routing delay mismatches between the transmit channels 204. Some suitable approaches for correction of routing delay mismatches in transmit channels are described in the previous cited United States Patent Publication No. 2015/0276918.

To perform the digital correction of routing delay mismatches and IF filter response mismatches of the receive channels 202, the DFE 222 includes mismatch compensation circuitry that includes, for each receive channel 202, a frequency shifter and a digital IF response mismatch compensation filter 330, 332, 334, 336 coupled to respective frequency shifters to receive the signal output by the respective frequency shifter. In the depicted embodiment, each frequency shifter includes a digital mixer 320, 322, 324, 326 coupled to the respective ADC of the respective receive channel to receive the digital IF signal and a programmable digital frequency generator 340, 342, 344, 346 coupled to the digital mixer 320, 322, 324, 326 to provide a shift signal of the needed frequency and phase to shift the frequency of the digital IF signal as needed to correct the routing delay mismatch in the respective receive channel. Each digital mixer 320, 322, 324, 326 multiplies the received digital IF signal and the shift signal from the respective frequency generator 340, 342, 344, 346 to generate a digital IF signal modified to compensate for the routing delay mismatch of the respective receive channel.

In general, a digital frequency generator is a component that produces a complex digital signal based on input values for one or more of the following parameters: desired tone frequency $f_{tone}$, desired tone phase $\varphi$, desired tone amplitude A, and sampling frequency Fs. The resulting signal is given by $$s(n) = A\exp\left(j\left(2\pi n \frac{f_{tone}}{F_s} + \phi\right)\right) = A\cos\left(2\pi n \frac{f_{tone}}{F_s} + \phi\right) + jA\sin\left(2\pi n \frac{f_{tone}}{F_s} + \phi\right).$$

In various embodiments, the input parameters to the frequency generators 340, 342, 344, 346 are the desired phase and frequency of the output signal, i.e., the phase and frequency values that will compensate for the effect of any routing delay mismatch in the respective receive channel when mixed with digital IF signal. The sampling frequency $F_s$ is typically known a priori, and is fixed, for a fixed ADC sampling rate and for a fixed position of the digital mixer in the DFE. The amplitude A is also typically known a priori.

In some embodiments, the values of the phase and frequency parameters for the frequency generators 340, 342, 344, 346 are determined by factory calibration using a calibration mode of the radar transceiver IC 102. In some embodiments, the values of the phase and frequency parameters may be tuned during operation of the radar system 100 using the calibration mode. Calibration to determine the initial values of the phase and frequency parameters and to tune these values during operation of the radar system 100 is described in reference to the method of FIGS. 7-10. In some embodiments, the values of the phase and frequency parameters may be directly programmed based on knowledge of the routing delay mismatches.

The digital IF response mismatch compensation filters 330, 332, 334, 336 operate to compensate for any IF filter response mismatch remaining after the removal of the frequency offsets by the frequency shifting of the digital IF signals. The IF response mismatch compensation filters 330, 332, 334, 336 may be implemented as complex coefficient digital infinite impulse response (IIR) filters, with programmable coefficients that can be determined by calibration. The concept is initially explained assuming a simple first order high pass filter (HPF) that models the desired IF filter response. With good over-sampling, the bilinear transform faithfully translates the desired analog HPF H(s) response to an equivalent digital HPF H(z) response as per $$H(s) = G\frac{s/\omega_c}{s/\omega_c + 1} \xrightarrow{\text{Bilinear Transform}} H(z) = \alpha\frac{1-z^{-1}}{1-r_c z^{-1}},$$

$$r_c = \left(\frac{1 - \frac{\omega_c}{2F_s}}{1 + \frac{\omega_c}{2F_s}}\right)$$

where G is the in-band gain of the HPF, $F_s$ is the digital sampling rate, $\omega_c$ is the HPF corner frequency expressed in radians per second, $r_c$, the value of which is directly determined by $\omega_c$ and $F_s$, is the equivalent digital filter pole, s is the complex frequency of the s-transform, z is the complex frequency of the z-transform, and $\alpha$ is a scale factor used to ensure the same in-band gain level G as the original analog response, i.e., $$\alpha = \frac{G}{1 + \frac{\omega_c}{2F_s}}.$$

The HPF corner frequency, which is also known as the 3 dB corner frequency or cut-off frequency or pole frequency, is given by $$f_c = \frac{\omega_c}{2\pi}.$$

A tone at frequency $f_c$ will be attenuated by 3 dB compared to an in-band tone. This is true of a first order pole.

The description below assumes that the IF filter responses on the in-phase (I) and quadrature (Q) arms of each receive channel are matched and thus a single IF filter response for each receive channel can be assumed. The actual IF filter response for a particular receive channel may be different from the desired IF filter response because of errors in the in-band gain and the cut-off frequency, and may be given by $$H_{actual}(s) = \tilde{G}\frac{s/\tilde{\omega}_c}{s/\tilde{\omega}_c + 1} \xrightarrow{\text{Bilinear Transform}} H_{actual}(z) = \tilde{\alpha}\frac{1-z^{-1}}{1-\tilde{r}_c z^{-1}},$$

$$\tilde{r}_c = \left(\frac{1-\frac{\tilde{\omega}_c}{2F_s}}{1+\frac{\tilde{\omega}_c}{2F_s}}\right)$$

where the use of ~ as an accent in $H_{actual}(z)$ indicates values that are potentially different from corresponding values of the desired response $H(z)$.

Assuming that the digital frequency shift applied in a particular receive channel to compensate for routing delay mismatch is $-f_o$, the effective equivalent filter response for the receive channel becomes $$H_{actual}(s) = \tilde{G}\frac{s/\tilde{\omega}_c}{s/\tilde{\omega}_c + 1} \xrightarrow{\text{Bilinear Transform}} H_{actual}(z) = \tilde{\alpha}\frac{1-e^{-j\omega_0}z^{-1}}{1-(\tilde{r}_c e^{-j\omega_0})z^{-1}},$$

$$\tilde{r}_c = \left(\frac{1-\frac{\tilde{\omega}_c}{2F_s}}{1+\frac{\tilde{\omega}_c}{2F_s}}\right)$$

where $$\omega_0 = 2\pi \frac{f_0}{F_s}$$

and $$e^{-j\omega_0} = \cos(\omega_0) - j\sin(\omega_0).$$

The digital IF response mismatch compensation filter in the receive channel operates to transform $H_{actual}(z)$ to a close approximation of the desired $H(z)$. More specifically, in some embodiments, the digital IF response mismatch compensation filter implements a complex-coefficient digital IIR filter $G_{comp}(z)$ that transforms $H_{actual}(z)$ to a close approximation of the desired $H(z)$.

Figure 4:
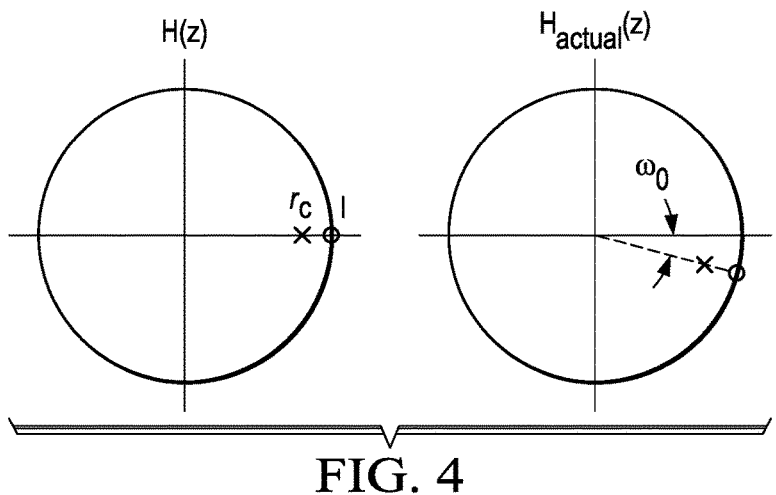
FIGS. 4, 5A, and 5B are pole zero plots.
Figure 5A:
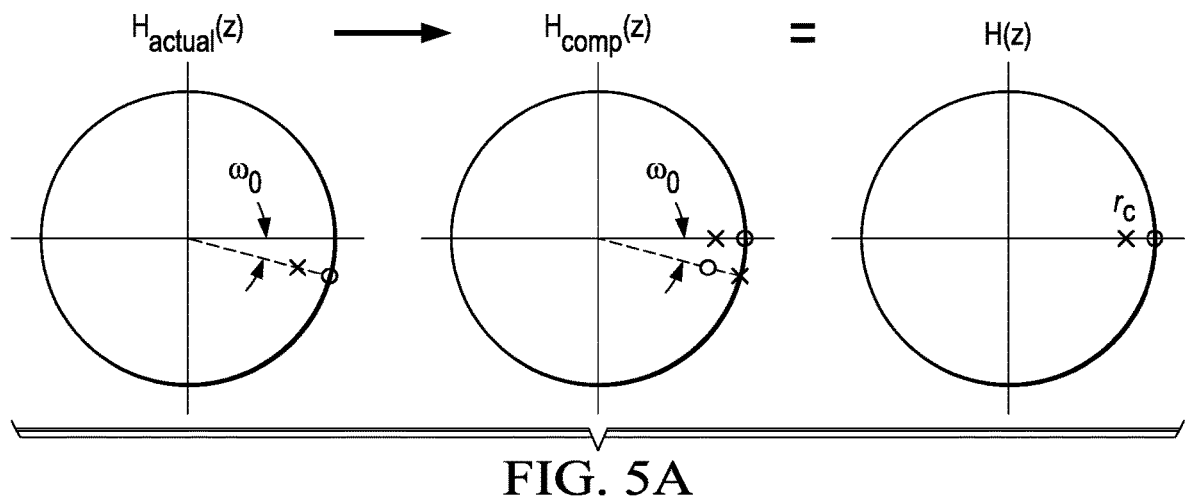

As is illustrated by the pole zero plots of $H(z)$ and $H_{actual}(z)$ in FIG. 4, the frequency shift manifests as a rotation of the pole-zero plot. Ideally, the digital IF response mismatch compensation filter would implement $H_{comp}(z)$ to transform $H_{actual}(Z)$ to the desired $H(z)$ as per $$H_{comp}(z) = \tilde{\gamma}\left(\frac{1-(\tilde{r}_c e^{-j\omega_0})z^{-1}}{1-e^{-j\omega_0}z^{-1}}\right)\left(\frac{1-z^{-1}}{1-r_c z^{-1}}\right)$$

where $$\tilde{\gamma} = \left(\frac{\alpha}{\tilde{\alpha}}\right)$$

is the gain mismatch factor, resulting in, as illustrated in the pole zero plots of FIG. 5A, the removal of the rotated pole-zero pair and restoration of the original pole-zero pair. However, this ideal compensation filter is unstable because of the pole on the unit circle.

The digital IF response mismatch compensation filter can implement an approximate and stable compensation filter $G_{comp}(z)$ with the following response $$G_{comp}(z) = \tilde{\gamma}\left(\frac{1-(\tilde{r}_c e^{-j\omega_0})z^{-1}}{1-r_1 e^{-j\omega_0}z^{-1}}\right)\left(\frac{1-z^{-1}}{1-r_c z^{-1}}\right), \; r_1 < 1$$

Figure 5B:
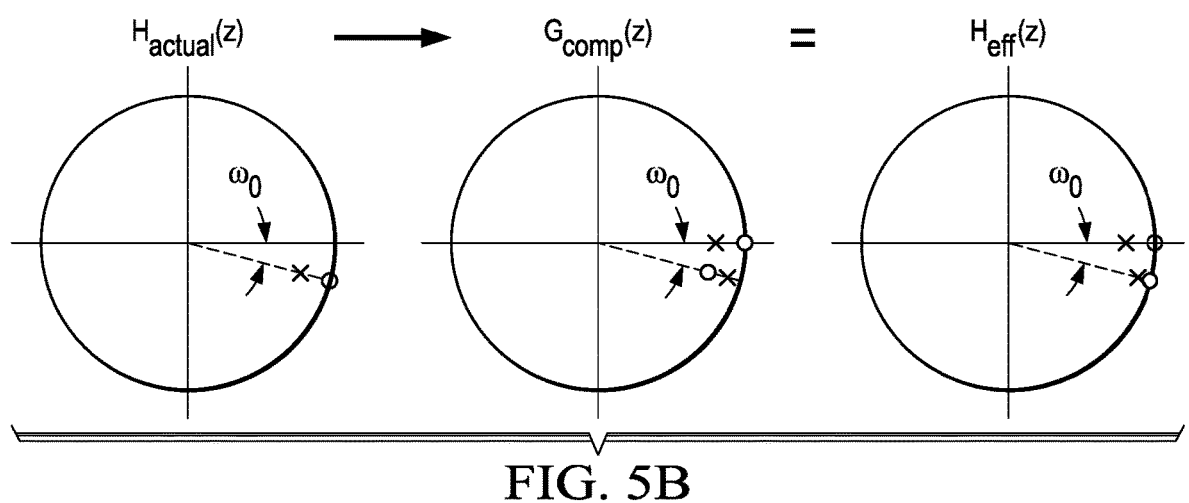

As illustrated in the pole zero plots of FIG. 5B, the use of this approximate compensation filter results in a pole very close to the unit circle, leaving a narrow "residual notch" at $-\omega_0$, which is acceptable as the residual notch at $-\omega_0$ is completely out of band because the IF signal in FMCW radar is one-sided. Note that the frequency shift direction for routing delay IF response mismatch compensation can be chosen such that the post-compensation notch component appears out of band.

More specifically, the effective, i.e., compensated, response $H_{eff}(z)$ is given by $$H_{eff}(z) = H_{actual}(z)G_{comp}(z)$$

$$= \tilde{\alpha}\frac{1-e^{-j\omega_0}z^{-1}}{1-(\tilde{r}_c e^{-j\omega_0})z^{-1}}\tilde{\gamma}\left(\frac{1-(\tilde{r}_c e^{-j\omega_0})z^{-1}}{1-r_1 e^{-j\omega_0}z^{-1}}\right)\left(\frac{1-z^{-1}}{1-r_c z^{-1}}\right)$$

$$= \left[\alpha\left(\frac{1-z^{-1}}{1-r_c z^{-1}}\right)\right]\left(\frac{1-e^{-j\omega_0}z^{-1}}{1-r_1 e^{-j\omega_0}z^{-1}}\right) = H(z)H_{notch}(z).$$

The result is a close approximation of the desired response, except for the notch. The notch can be made as narrow as desired by pushing the value of $r_1$ closer to 1 at the cost of increased implementation complexity.

In various embodiments, the input parameters to each of the digital IF response mismatch compensation filters 330, 332, 334, 336 are the gain mismatch factory $\tilde{\gamma}$, the digital pole $\tilde{r}_c$, and the digital frequency shift parameter $\omega_0$. Note that $r_1$ is a design parameter and $r_c$ is known because the desired response is known. In some embodiments, the values of the input parameters $\tilde{\gamma}$, $\tilde{r}_c$, and $\omega_0$ for the IF response mismatch compensation filters may be directly programmed based on knowledge of the routing delay mismatches. In some embodiments, the values of the input parameters $\tilde{\gamma}$, $\tilde{r}_c$, and $\omega_0$ for the digital IF response mismatch compensation filters 330, 332, 334, 336 may be determined by factory calibration using a calibration mode of the radar transceiver IC 102. In some embodiments, the values of these parameters may be tuned during operation of the radar system 100 using the calibration mode. Calibration to determine the initial values of these parameters and to tune these values during operation of the radar system 100 is described in reference to the method of FIGS. 7-10.

The digital IF response mismatch compensation filters 330, 332, 334, 336 are programmed assuming that the analog IF filters in each of the receive channels are calibrated to have matching responses in the I and Q channels. In some embodiments, the filter responses for the I and Q channels in each receive channel are locally well matched, i.e., for a given receive channel, the filter responses for the I and Q channels match but there may be a global mismatch in filter responses across the receive channels. In such embodiments, the local filter response match may be due to, for example, the physical proximity of the filters and/or "filter trimming" performed using a calibration signal generator and programmable CTRIM and RTRIM controls. Any global mismatch in filter responses across receive channels may be corrected in the digital IF response mismatch compensation filters by letting the parameters $\tilde{\gamma}$ and $\tilde{r}_c$ be different for different receive channels.

Figure 6:
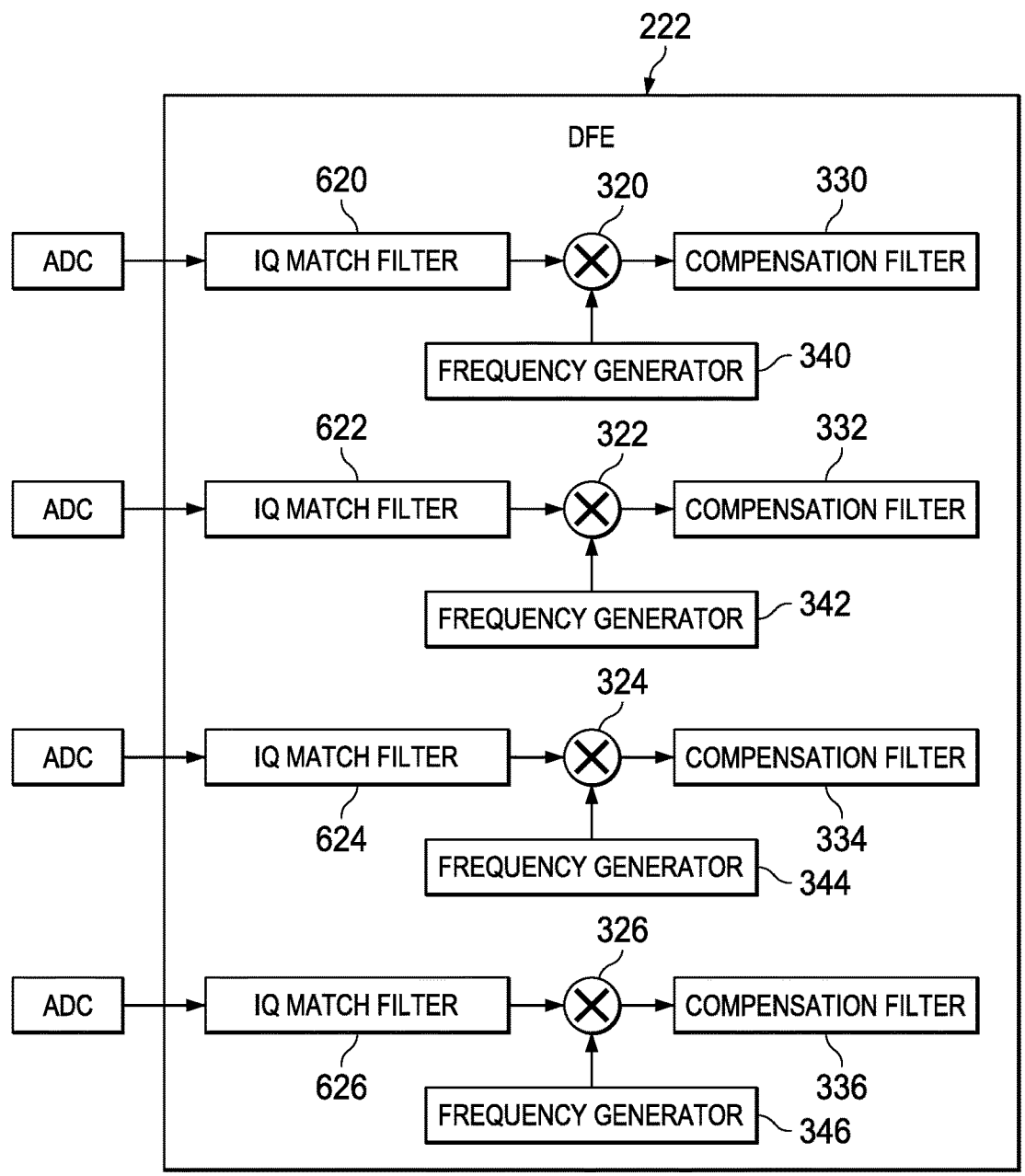
FIG. 6 is a block diagram of an example digital frontend component of the radar system of FIGS. 1, 2, and 3.

As previously mentioned, in some embodiments, the DFE 222 includes functionality to compensate for the IQ filter response mismatches prior to routing delay mismatch compensation. More specifically, as shown in the example of FIG. 6, an embodiment of the DFE 222 includes, for each receive channel 202, a digital IQ matching filter 620, 622, 624, 626 coupled between respective ADCs and digital mixers 320, 322, 324, 326. The digital IQ matching filters 620, 622, 624, 626 operate to correct the IQ filter imbalances in respective receive channels before the frequency shifted signal is generated by the respective digital mixers 320, 322, 324, 326.

The IQ matching filters 620, 622, 624, 626 may be implemented as separate pole-zero relocating real coefficient digital IIR filters on the I and Q arms of each receive channel with programmable coefficients (parameters) that can be determined by calibration. As with the description of the digital IF response mismatch compensation filters, a simple first order HPF that models the desired IF filter response is assumed. As previously mentioned, with good over-sampling, the bilinear transform translates the desired analog HPF H(s) response to an equivalent digital HPF H(z) response as per $$H(s) = G\frac{s/\omega_c}{s/\omega_c + 1} \xrightarrow{Bilinear\ Transform} H(z) = \alpha\frac{1-z^{-1}}{1-r_c z^{-1}},$$

$$r_c = \left(\frac{1-\frac{\omega_c}{2F_s}}{1+\frac{\omega_c}{2F_s}}\right)$$

Assuming an IQ filter imbalance, i.e., a mismatched corner frequency and in-band gain between IF Filters on the I and Q channels of a particular receive channel, the effective equivalent filter responses in the I and Q channels are given by $$H_{actual,I}(s) = \tilde{G}_I \frac{s/\tilde{\omega}_{c,I}}{s/\tilde{\omega}_{c,I}+1} \xrightarrow{Bilinear\ Transform} H_{actual,I}(z) = \tilde{\alpha}_I \frac{1-z^{-1}}{1-\tilde{r}_{c,I}z^{-1}}$$

$$H_{actual,Q}(s) = \tilde{G}_Q \frac{s/\tilde{\omega}_{c,Q}}{s/\tilde{\omega}_{c,Q}+1} \xrightarrow{Bilinear\ Transform} H_{actual,Q}(z) = \tilde{\alpha}_Q \frac{1-z^{-1}}{1-\tilde{r}_{c,Q}z^{-1}}$$

where $$\tilde{r}_{c,I} = \left(\frac{1-\frac{\tilde{\omega}_{c,I}}{2F_s}}{1+\frac{\tilde{\omega}_{c,I}}{2F_s}}\right) \text{ and } \tilde{r}_{c,Q} = \left(\frac{1-\frac{\tilde{\omega}_{c,Q}}{2F_s}}{1+\frac{\tilde{\omega}_{c,Q}}{2F_s}}\right).$$

Let $$\tilde{\gamma}_I = \left(\frac{\alpha}{\tilde{\alpha}_I}\right) \text{ and } \tilde{\gamma}_Q = \left(\frac{\alpha}{\tilde{\alpha}_Q}\right)$$

denote the gain mismatch factors for the I and the Q channels, respectively. Here, as before, the ~ accents indicate that the values are potentially different from those corresponding to the desired response H(z). The digital IQ matching filter associated with this receive channel operates to transform $H_{actual,I}(z)$ and $H_{actual,Q}(Z)$ to a common $H_{actual}(z)$.

In an example embodiment, the digital IQ matching filter for a particular receive channel implements a filter $G_{match,I}(z)$ on the I channel alone, but does not perform any filtering on the Q channel, using the following response:

$$G_{match,I}(z) = \left(\frac{\tilde{\alpha}_Q}{\tilde{\alpha}_I}\right)\left(\frac{1-\tilde{r}_{c,I}z^{-1}}{1-\tilde{r}_{c,Q}z^{-1}}\right) = \left(\frac{\tilde{\gamma}_I}{\tilde{\gamma}_Q}\right)\left(\frac{1-\tilde{r}_{c,I}z^{-1}}{1-\tilde{r}_{c,Q}z^{-1}}\right).$$

This causes the I channel response to be transformed to $$H_{new,I}(z) = H_{actual,I}(z)G_{match,I}(z)$$

$$= \left[\tilde{\alpha}_I \frac{1-z^{-1}}{1-\tilde{r}_{c,I}z^{-1}}\right]\left[\left(\frac{\tilde{\alpha}_Q}{\tilde{\alpha}_I}\right)\left(\frac{1-\tilde{r}_{c,I}z^{-1}}{1-\tilde{r}_{c,Q}z^{-1}}\right)\right]$$

$$= \tilde{\alpha}_Q \frac{1-z^{-1}}{1-\tilde{r}_{c,Q}z^{-1}}$$

which results in a common effective filter response for the I and Q channels of the particular receive channel, given by $$H_{actual}(z) = H_{new,I}(z) = H_{actual,Q}(z) = \tilde{\alpha}_Q \frac{1-z^{-1}}{1-\tilde{r}_{c,Q}z^{-1}}.$$

In such an embodiment, the effective IF filter parameters for the receive channel under consideration become $\tilde{\alpha}=\tilde{\alpha}_Q$ and $\tilde{r}_c=\tilde{r}_{c,Q}$.

One of ordinary skill in the art will understand other embodiments in which the IQ matching filter is implemented using a filter on the Q channel alone, with the I channel left as-is. In such embodiments, the effective IF filter parameters for the receive channel under consideration become $\tilde{\alpha}=\tilde{\alpha}_I$ and $\tilde{r}_c=\tilde{r}_{c,I}$. The fact that the resultant $H_{actual}(z)$ for the receive channel is potentially different from the desired H(z) (because, potentially, $\tilde{\alpha}\ne\alpha$ and $\tilde{r}_c\ne r_c$), and could be different across receive channels, is then addressed using the digital IF response mismatch compensation filter as described earlier.

In various embodiments, the input parameters to each of the digital IQ matching filters are the gain mismatch factors $\tilde{\gamma}_I, \tilde{\gamma}_Q$ and the digital poles $\tilde{r}_{c,I}, \tilde{r}_{c,Q}$. Also, the effective gain mismatch factory $\tilde{\gamma}$, and the digital pole $\tilde{r}_c$ parameter values for the digital IF response mismatch compensation filters 330, 332, 334, 336 are determined by the corresponding $\tilde{\gamma}_I, \tilde{\gamma}_Q$ and $\tilde{r}_{c,I}, \tilde{r}_{c,Q}$ as described previously. In some embodiments, the values of the input parameters $\tilde{\gamma}_I, \tilde{\gamma}_Q$ and $\tilde{r}_{c,I}, \tilde{r}_{c,Q}$ are determined by factory calibration using a calibration mode of the radar transceiver IC 102. In some embodiments, the values of these parameters may be tuned during operation of the radar system 100 using the calibration mode. Calibration to determine the initial values of these parameters and to tune these values during operation of the radar system 100 is described in reference to the method of FIG. 8.

Figure 7:
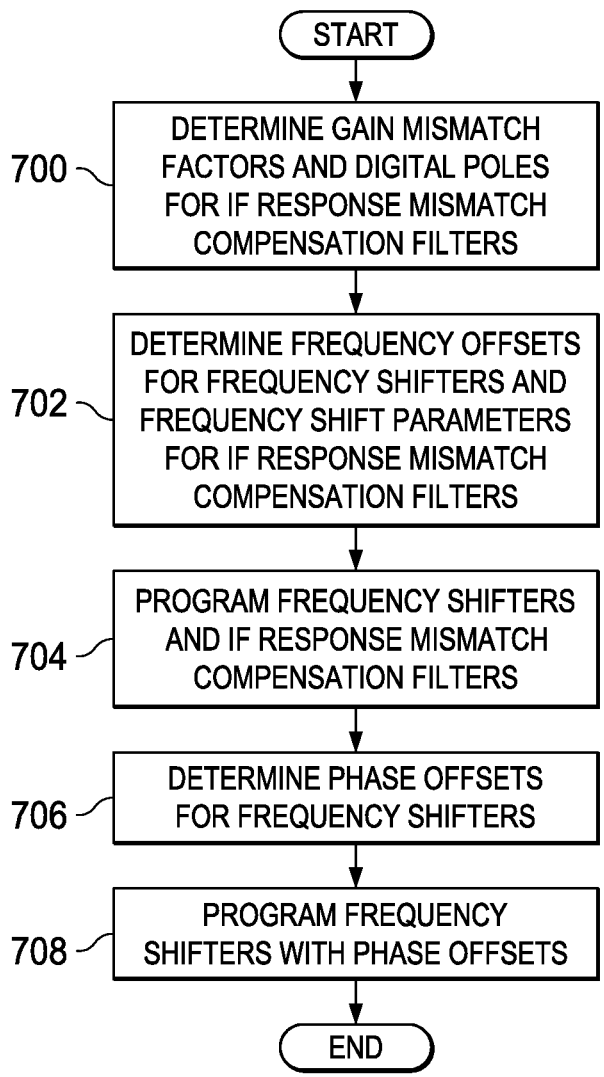
FIGS. 7-10 are flow diagrams of a calibration method in an FMCW radar system such as that of FIGS. 1-3 and 6.
Figure 8:
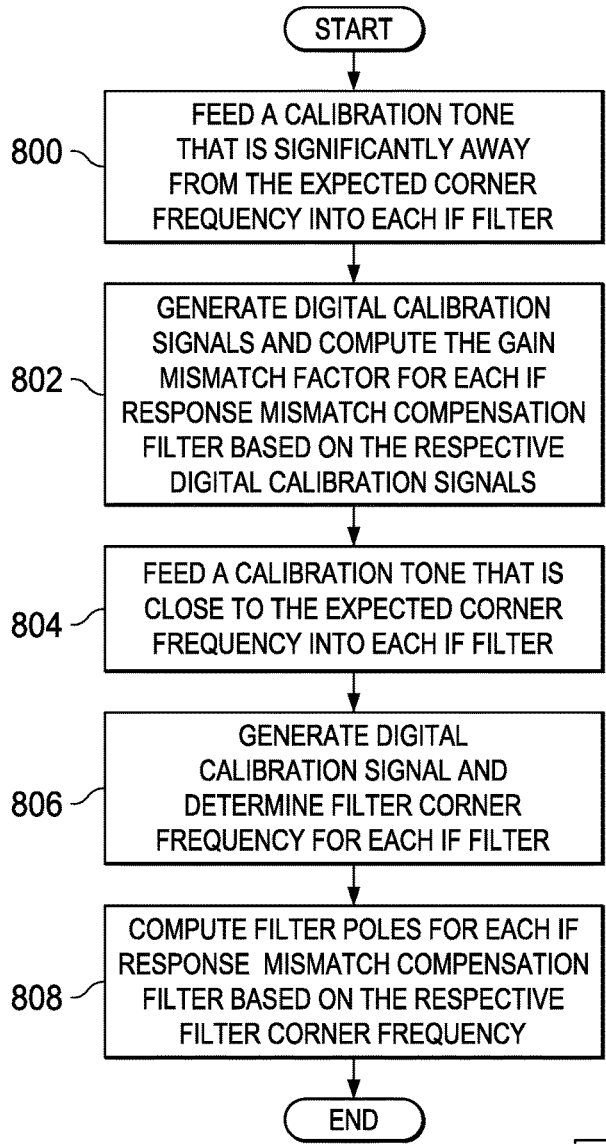
Figure 9:
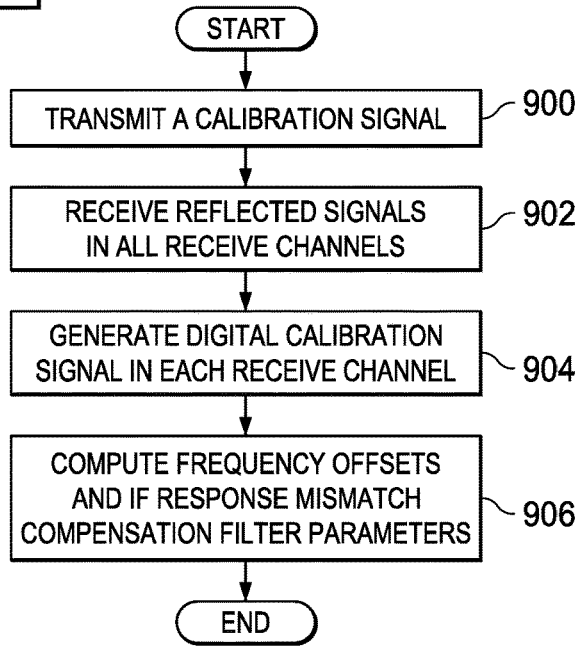
Figure 10:
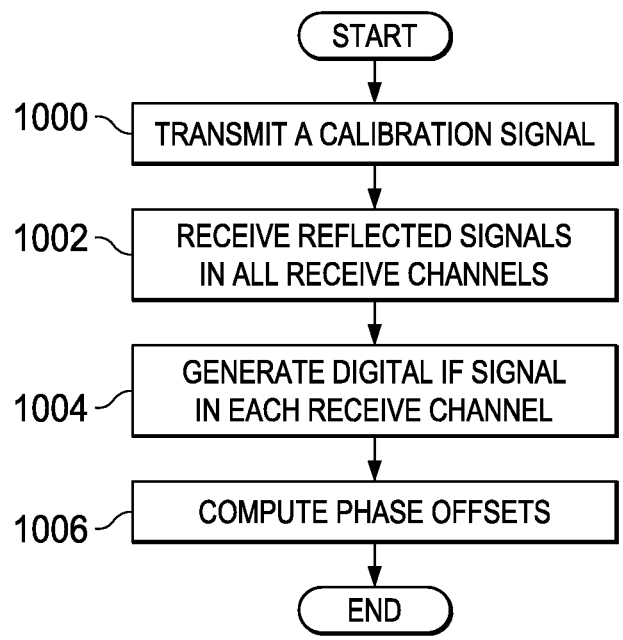

FIGS. 7-10 are flow diagrams of a method for calibrating frequency shifters and compensation filters used for digital compensation for routing delay mismatches and IF filter response mismatches in an FMCW radar system such as that of FIGS. 1-3. FIG. 7 is a flow diagram of the calibration flow and FIGS. 8-10 are flow diagrams of specific aspects of the calibration. Portions of the depicted method may be performed during factory calibration using a reflector at a known position and angle. Further, in some embodiments, the depicted method may be used during operation of the radar system for recalibration if a reflector at a known position and angle is present, e.g., a vehicle bumper. In such embodiments, the method may be performed periodically, e.g., every few seconds, to compensate for potential changes in the receive channels during operation, e.g., for ambient temperature change induced residual imbalances such as expansion/contraction of metal traces or antenna responses. How often the method is performed during operation of the radar system may depend, for example, on the particular application of the system.

The method of FIGS. 7-10 is explained in reference to the radar system 100 of FIGS. 1-3. One or ordinary skill in the art will understand method embodiments for other embodiments of an FMCW radar system. To perform the method, the radar system 100 is placed in calibration mode by the control module 228. Referring first to FIG. 7, initially the control module 228 determines 700 the gain mismatch factors and the digital poles for each IF response mismatch compensation filter. Determination of the values of these parameters is explained below in reference to FIG. 8. The control module 228 then determines 702 the frequency offsets for the frequency shifters and the frequency shift parameters for the IF response mismatch compensation filters. Determination of the values of these parameters is explained below in reference to FIG. 9. The control module 228 then programs 704 the frequency generators 340, 342, 344, 346 and the digital match compensation filters 330, 332, 334, 336 using the computed parameters. The control module 228 then determines 706 the phase offsets for the frequency shifters. Determination of the values of these parameters is explained below in reference to FIG. 10. The control module 228 then programs 708 the frequency shifters with the phase offsets.

FIG. 8 is a flow diagram illustrating determination of gain mismatch factors and digital poles for the digital IF response mismatch compensation filters as per step 700 of FIG. 7. To perform the depicted steps, the frequency shifters and the digital IF response mismatch compensation filters are disabled, bypassed, or programmed to have no effect. Initially, the control module 228, using a programmable IF calibration signal generator, causes a calibration tone to be fed 800 into each IF filter being calibrated. The calibration signal should have a frequency that is well in-band and far away from the corner frequency. For example, for an HPF, the frequency will be significantly away from the expected HPF corner frequency, e.g., the HPF corner frequency is 100 kHz and the frequency of the calibration tone is 10 MHz. In some embodiments, the calibration tone is fed directly from the calibration signal generator to the IF filter. In some embodiments, the mixer in the analog baseband is disabled to avoid a spurious signal from the mixer output during calibration.

Digital calibration signals are generated 802 in the I and Q arms of each receive channel and the control module 228 computes the value of the gain mismatch factory $\tilde{\gamma}$ for each IF response mismatch compensation filter. More specifically, for each digital calibration signal, the control module 228 performs an FFT (separately on the I and Q arms of each receive channel), and measures the magnitude (absolute value) of the frequency component corresponding to the in-band calibration tone. For each IF filter, this magnitude, $\tilde{\rho}_{in}$, is proportional to the IF filter gain, $\tilde{\alpha}$, and is compared to the expected magnitude, $\rho_{in}$ (which is known based on the expected IF filter gain $\alpha$) to obtain the value of the gain mismatch factor $\tilde{\gamma}$ as per $$\frac{\alpha}{\tilde{\alpha}} = \frac{\rho_{in}}{\tilde{\rho}_{in}} = \tilde{\gamma}$$

The control module 228, again using the programmable IF calibration signal generator, causes another calibration tone to be fed 804 into each IF filter. This calibration signal should be at a frequency $f_{calib}$ close to the desired IF filter corner frequency $f_c$ (so as to not be considered in-band). Digital calibration signals are generated 806 in the I and Q arms of each receive channel and the control module 228 performs an FFT (separately on the I and Q arms of each receive channel), and measures the magnitude (absolute value) of the frequency component corresponding to the calibration tone. For each IF filter, this magnitude, $\tilde{\rho}_{calib}$ along with the magnitude of the in-band calibration tone measured earlier, $\tilde{\rho}_{in}$, is used to compute the IF filter corner frequency $\tilde{f}_c$ through the following approximate relation (assuming the example first order HPF):

$$\left(\frac{\tilde{\rho}_{in}}{\tilde{\rho}_{calib}}\right)^2 = \frac{1 + \left(\frac{f_{calib}}{\tilde{f}_c}\right)^2}{\left(\frac{f_{calib}}{\tilde{f}_c}\right)^2}$$

The above equation is a quadratic equation in $(1/\tilde{f}_c)$ and can be solved to compute $\tilde{f}_c$.

Once the filter corner frequencies $\tilde{f}_c$ are computed, the control module 228 then computes 808 the values of the corresponding digital filter poles $\tilde{r}_c$ for each IF response mismatch compensation filter based on the respective $\tilde{\omega}_c = 2\pi \tilde{f}_c$ as per $$\tilde{r}_c = \left(\frac{1 - \frac{\tilde{\omega}_c}{2F_S}}{1 + \frac{\tilde{\omega}_c}{2F_S}}\right).$$

FIG. 9 is a flow diagram illustrating determination of the frequency offsets and frequency shift parameters as per step 702 of FIG. 7. Initially, the control module 228 causes the generation of at least one chirp that is transmitted 900 by one of the transmit channels 204. The chirp bandwidth, slope, etc., may be chosen based on criteria such as the specific application of the radar system, the expected range of variation in trace-lengths, etc.

The reflected signal from the known reflector is received 902 in all receive channels 202 and a digital calibration signal is generated 904 in each receive channel. The control module 228 then computes 906 frequency offsets for the frequency generators 340, 342, 344, 346 and frequency shift parameters for the compensation filters 330, 332, 334, 336 based on the digital calibration signals. In some embodiments, the frequency shifters and IF response mismatch compensation filters in the DFE 222 are bypassed and the digital calibration signals are provided directly to the control module 228. In some embodiments, the frequency shifters and IF response mismatch compensation filters are programmed (or disabled) to have no effect on the digital calibration signals.

To compute the frequency offsets, one of the receive channels 202 is designated as a reference receive channel and frequency offsets for the frequency generators in the other receive channels are computed relative to the reference receive channel. The frequency of the digital calibration signal in the reference receive channel and each non-reference receive channel $RX_i$ is computed, i.e., $f_{Rx_i}$ is computed, where i indicates a particular receiver. The frequency may be computed, for example, by performing a Fast Fourier Transform (FFT) on the digital calibration signal, and identifying the location of the peak in terms of an FFT bin index (interpolating between bin locations, if needed, to get a fractional part for the bin index). The frequency is determined given the sampling rate of the FFT input, the FFT size, and the location of the peak (as a bin index).

Assuming that $RX_1$ is the reference receive channel, frequency corrections that need to be applied to each of the other receive channels i to compensate for routing delay mismatch with the reference receive channel are computed based on the values of $f_{Rx_1}$ and $f_{Rx_i}$. That is, the frequency shift needed between the reference receive channel $RX_1$ and a non-reference receive channel $RX_i$ is computed as $f_{Rx_1} - f_{Rx_i}$.

The frequency shift parameters $\omega_{0,i}$ for the IF response mismatch compensation filters corresponding to the receive channels $RX_i$ are then computed based on the frequency offsets determined for these receive channels. Note that for the reference receive channel the compensation filter will not have any frequency-shift based ($e^{-j\omega_0}$) modification, i.e., $\omega_0$ is 0 for the reference receive channel.

For each non-reference receive channel $RX_i$ a frequency shift $-f_{0,i}$ corresponding to the offset in the frequency of the IF signal from the non-reference receive channel with respect to the frequency of the IF signal from the reference channel is applied to correct the routing delay mismatch between the two channels. Specifically, for each non-reference receive channel $RX_i$, $$f_{0,i} = f_{RXi} - f_{RX1}.$$

No frequency shift is applied to the reference receive channel $RX_1$, thus $f_{0,1} = 0$. The value of $\omega_{0,i}$ may be computed as per $$\omega_{0,i} = 2\pi \frac{f_{0,i}}{F_S}.$$

FIG. 10 is a flow diagram illustrating determination of the phase offsets as per step 706 of FIG. 7. Initially, the control module 228 causes the generation of at least one chirp that is transmitted 1000 by one of the transmit channels 204. The reflected signal from the known reflector is received 1002 in all receive channels 202 and a digital calibration signal is generated 1004 in each receive channel. The control module 228 then computes 1006 phase offsets for the frequency generators 340, 342, 344, 346 based on the digital calibration signals. In this instance, the digital calibration signals received by the control module 228 are processed by respective frequency shifters and digital mismatch filters. Note that the frequency shifter for the reference receive channel may be disabled, bypassed, or programmed to have no effect.

The phase of the digital calibration signal in the reference receive channel $RX_1$ and in each receive channel $RX_i$ is computed, i.e., $\theta_{RX_i}$ is computed, where i indicates a particular receiver. The phase may be computed, for example, by performing a Fast Fourier Transform (FFT) on the digital calibration signal, and identifying the location of the peak in terms of an FFT bin index (interpolating between bin locations, if needed, to get a fractional part for the bin index), and determining the phase angle of the peak.

The phase corrections that need to be applied to each of the non-reference receive channels i to compensate for routing delay mismatch with the reference receive channel are computed based on the values of $\theta_{RX_1}$, $\theta_{RX_i}$, and $\Delta\theta_{RX_{i1}}$. Given that the frequencies of the signals are identical after the frequency shifts are applied, in the absence of any routing delay mismatch induced phase offsets, the $\theta_{RX_i}$ are related to $\theta_{RX_1}$ through a known formula. In general, the relation of the $\theta_{RX_i}$ to $\theta_{RX_1}$ is of the form $$\theta_{RX_i} = \theta_{RX_1} + \Delta\theta_{RX_{i1}}$$

where $\Delta\theta_{RX_{i1}}$ is known a priori for a known angular position of the calibration reflector and the structure of the antenna array. Thus the phase offset for each of the non-reference receive channels may be computed as $\theta_{RX_1} + \Delta\theta_{RX_{i1}} - \theta_{RX_i}$.

The method of FIGS. 7-10 assumes that the analog IF filters in the receive channels are calibrated to have matching responses in the I and Q channels. As was previously mentioned, in some embodiments, a digital IQ matching filter is used to remove the IQ filter mismatches. In such embodiments, the method of FIG. 7-10 is modified to include determination of parameters for the digital IQ matching filters 620, 622, 624, 626 and programming of these filters. More specifically, step 700 of FIG. 7 will include determination of the parameters for the digital IQ matching filters and will also include programming the digital IQ matching filters according to these parameters prior to step 702. Further, the flow of FIG. 8 will include determination of the parameters for the digital IQ matching filters 620, 622, 624, 626. One of ordinary skill in the art will understand from prior description herein that if the responses of the IF filters in the I and Q channels of a receive channel are not matched, the flow of FIG. 8 will provide the needed parameter values for the IQ matching filters as well as values for the gain mismatch factors and digital poles.

Figure 11:
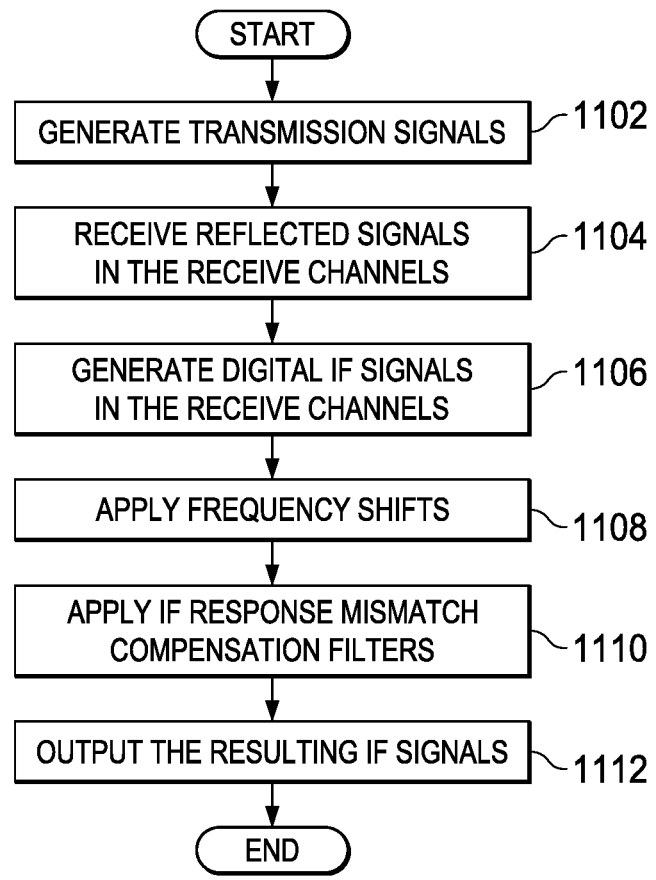
FIG. 11 is a flow diagram of a method for digital compensation for routing delay mismatches and intermediate frequency (IF) filter response mismatches.

FIG. 11 is a flow diagram of a method for digital compensation for routing delay mismatches and IF filter response mismatches in receive channels of an FMCW radar system such as that of FIGS. 1-3. The depicted method may be performed for each frame of radar chirps. The depicted method assumes that the frequency shifters and the digital IF response mismatch compensation filters have been suitably programmed. The parameter values for the shifters and the compensation filters may be determined, for example, using self-calibration as per the method of FIGS. 7-10. Further, the depicted method is explained in reference to the radar system 100 of FIG. 1-3. One of ordinary skill in the art will understand method embodiments for other embodiments of an FMCW radar system.

Initially, the control module 228 causes the generation 1102 of transmission signals for a frame of chirps. The reflected signals are received 1104 in each of the receive channels and a digital IF signal is generated 1106 in each receive channel. The frequency shifter corresponding to each receive channel except the reference receive channel applies 1108 a frequency shift to the respective digital IF signal to generate a frequency shifted IF signal. As explained in reference to FIGS. 7-10, one of the receive channels is treated as a reference receive channel that is used as the basis for determining the frequency shift parameters for the other receive channels and, thus, no frequency shifting is applied to the digital IF signal generated in the reference receive channel.

The digital IF response mismatch compensation filter component corresponding to each receive channel that generates a frequency shifted IF signal then applies 1110 a compensation filter to the respective digital IF signal output by the respective frequency shifter. In addition, the digital IF response mismatch compensation filter component corresponding to the reference receive channel applies a compensation filter to the respective digital IF signal. The resulting digital IF signals are then output 1112 for further processing.

The method of FIG. 11 has been described assuming that the analog IF filters in the receive channels are calibrated to have matching responses in the I and Q channels. As was previously mentioned, in some embodiments, a digital IQ matching filter is used to remove the IQ filter mismatches. Thus, in some embodiments of the method of FIG. 11, a digital IQ matching filter corresponding to each receive channel is applied to the respective digital IF signal prior to the frequency shifting of step 1108.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, some embodiments have been described herein in which the radar system is an embedded radar system in a vehicle. One of ordinary skill in the art will understand embodiments for other applications of embedded radar systems, e.g., surveillance and security applications, maneuvering a robot in a factory or warehouse, etc.

In another example, embodiments have been described herein in which the digital baseband includes a frequency generator for each receive channel. One of ordinary skill in the art will understand embodiments in which the frequency generation is provided by one or more frequency generation components configurable to provide the needed frequency shift signal to multiple digital mixers. For example, in some such embodiments, one such frequency generation component may be used to provide the needed frequency shift signals to all the digital mixers.

In another example, embodiments have been described herein assuming a single radar transceiver IC in the radar system. One of ordinary skill in the art will understand embodiments in which the radar system includes more than one radar transceiver IC and in which the described digital compensation of routing delay mismatches is performed across receive channels in two or more radar transceiver ICs.

In another example, one of ordinary skill in the art will understand embodiments in which the digital IF signals pass through one or more decimation filtering stages in the digital baseband before the digital compensation is applied.

In another example, one of ordinary skill in the art will understand embodiments of the compensation filters for a low pass filter (LPF) and for more complex transfer functions, e.g., for instances in which the analog base band includes multiple HPFs and/or LPFs.

In another example, embodiments have been described herein in which the determination of the IQ matching filter, frequency shifting and/or compensation filtering parameters is performed by a control component on a radar transceiver IC. One of ordinary skill in the art will understand embodiments in which the parameter determination is performed off-chip by another processor.

In another example, embodiments have been described herein in which the digital baseband includes a frequency shifter and a digital IF response mismatch compensation filter for each receive channel. One of ordinary skill in the art will understand embodiments in which the digital baseband does not include such components for the reference receive channel. The IF response mismatch compensation filter for a reference receive channel may be omitted if the response of the reference receive channel is the "desired response" for all the other channels.

In another example, embodiments have been described herein in which digital frequency shifting is performed before IF response mismatch compensation filtering. One of ordinary skill in the art will understand embodiments in which the order of the digital frequency shifting and the IF response mismatch compensation filtering is swapped. In such embodiments, for the HPF example used throughout, when the compensation filter is applied before the frequency shifting, the filter takes the form $$G'_{comp}(z) = \tilde{\gamma}\left(\frac{1-\tilde{r}_c z^{-1}}{1-r_1 z^{-1}}\right)\left(\frac{1-e^{j\omega_0}z^{-1}}{1-r_c e^{j\omega_0}z^{-1}}\right), \; r_1 < 1.$$

In another example, embodiments have been described herein in which the DFE includes both frequency shifters and digital IF response mismatch compensation filters. One of ordinary skill in the art will understand embodiments in which the digital IF response mismatch compensation filters are not present or are not used, e.g., embodiments in which the filter responses across receive channels are well matched by design and the required frequency shifts for routing delay matching are small enough to allow the IF filter response mismatch due to the frequency offsets to be ignored.

In another example, embodiments have been described herein in which the DFE includes both frequency shifters and digital IF response mismatch compensation filters. One of ordinary skill in the art will understand embodiments in which the frequency shifters are not present or are not used, e.g., embodiments in which the RF trace lengths are well matched, but IF filter responses of the receive channels are not matched due to, for example, spatial variations of circuit component values or variation across radar ICs in a multi-IC configuration.

In another example, embodiments are described herein in which $\tilde{f}_c$ is directly computed based on an approximate relation between the measured magnitude ratio and the filter cut-off. One of ordinary skill in the art will understand embodiments in which $\tilde{f}_c$ is determined differently. For example, an iterative technique may be used in which an initial calibration tone that is close to the expected corner frequency is fed to the IF filters and, for each IF filter, the filter gain is measured at that frequency. The calibration tone frequency is then iteratively moved in a direction such that the ratio of the "well in-band" magnitude and the "magnitude at the current frequency" moves closer and closer to 3 dB.

In another example, embodiments have been described herein in which the LO signal output by the SYNTH is provided to PPAs in the transmit channels and to the mixers in the receive channels. One of ordinary skill in the art will understand embodiments in which an LO distribution network is used. In general, an LO distribution network is a tree of cells that communicates the LO signal to the mixers of the receive channels and the shifters of the transmit channel. The cells may be, for example, wires or amplifiers such as the PPAs or frequency multipliers or frequency dividers.

In another example, embodiments have been described herein in which a clock multiplier is used. One of ordinary skill in the art will understand embodiments in which the multiplier is not needed because the SYNTH operates at the LO frequency rather than a lower frequency.

In another example, embodiments have been described herein in which the transmission signal generation circuitry is assumed to include a radio frequency synthesizer. One of ordinary skill in the art will understand embodiments in which this circuitry includes an open loop oscillator (radio frequency oscillator) plus a digital-to-analog converter (DAC) or other suitable transmission signal generation circuitry.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system comprising:
    a receive channel configured to receive a reflected signal and to generate a first digital intermediate frequency (IF) signal based on the reflected signal;
    a reference receive channel configured to receive the reflected signal and to generate a second digital IF signal based on the reflected signal; and
    digital mismatch compensation circuitry coupled to receive the first digital IF signal and the second digital IF signal, the digital mismatch compensation circuitry configured to process the first digital IF signal and the second digital IF signal to compensate for mismatches between the receive channel and the reference receive channel.

2. The radar system of claim 1, in which the digital mismatch compensation circuitry includes:
    a frequency shifter configured to shift a frequency and phase of the first digital IF signal to correct a routing delay mismatch between the receive channel and the reference receive channel.

3. The radar system of claim 1, in which the digital mismatch compensation circuitry includes:
    a digital IF response compensation filter configured to filter the first digital IF signal to correct an IF filter response mismatch between an IF filter of the receive channel and a desired IF filter response.

4. The radar system of claim 3, in which the digital mismatch compensation circuitry includes:
    a digital IF response compensation filter configured to filter the second digital IF signal to correct an IF filter response mismatch between an IF filter of the reference receive channel and the desired IF filter response.

5. The radar system of claim 3, in which the digital IF response compensation filter is a complex coefficient digital infinite impulse response (IIR) filter.

6. The radar system of claim 2, in which the frequency shifter includes:
    a digital frequency generator configured to generate a shift signal of a frequency and phase needed to correct the routing delay mismatch; and
    a digital mixer coupled to the digital frequency generator to receive the shift signal, the digital mixer configured to multiply the first digital IF signal and the shift signal.

7. The radar system of claim 1, in which parameters of the digital mismatch compensation circuitry are generated using a calibration mode of the radar system during at least one of factory calibration and radar system operation.

8. The radar system of claim 1, in which the reference receive channel and the receive channel are included in different radar transceiver integrated circuits in the radar system.

9. The radar system of claim 1, in which the digital mismatch compensation circuitry includes:
    at least one first digital IQ matching filter coupled to the receive channel to receive the first digital IF signal, the at least one first digital IQ matching filter configured to filter at least one of the in-band (I) and quadrature (Q) arms of the first digital IF signal to correct an IQ filter mismatch before the first digital IF signal is received by the digital mismatch compensation circuitry; and
    at least one second digital IQ matching filter coupled to the reference receive channel to receive the second digital IF signal, the at least one second digital IQ matching filter configured to filter at least one of the I and Q arms of the second digital IF signal to correct an IQ filter mismatch before the second digital IF signal is received by the digital mismatch compensation circuitry.

10. The radar system of claim 9, in which the at least one first and the at least one second digital IQ matching filters are real coefficient digital infinite impulse response (IIR) filters.

11. A method of operation of a radar system, the method comprising:
    receiving a reflected signal in a receive channel of the radar system and generating a first digital intermediate frequency (IF) signal based on the reflected signal;

receiving the reflected signal in a reference receive channel of the radar system and generating a second digital IF signal based on the reflected signal; and processing the first digital IF signal and the second digital IF signal by digital mismatch compensation circuitry of the radar system to compensate for mismatches between the receive channel and the reference receive channel.

12. The method of claim 11, in which processing the first digital IF signal includes:

shifting, by a frequency shifter, a frequency and phase of the first digital IF signal to correct a routing delay mismatch between the receive channel and the reference receive channel.

13. The method of claim 11, in which processing the first digital IF signal includes:

filtering, by a digital IF response mismatch compensation filter, the first digital IF signal to correct an IF filter response mismatch between an IF filter of the receive channel and a desired IF filter response.

14. The method of claim 13, in which processing the first digital IF signal includes:

filtering, by a digital IF response mismatch compensation filter, the second digital IF signal to correct an IF filter response mismatch between an IF filter of the reference receive channel and the desired IF filter response.

15. The method of claim 13, in which the digital IF response mismatch compensation filter is a complex coefficient digital infinite impulse response (IIR) filter.

16. The method of claim 12, in which shifting, by a frequency shifter, a frequency and phase of the first digital IF signal includes:

generating, by a digital frequency generator, a shift signal of a frequency and phase needed to correct the routing delay mismatch; and multiplying, by a digital mixer, the first digital IF signal and the shift signal.

17. The method of claim 11, in which parameters of the digital mismatch compensation circuitry are generated using a calibration mode of the radar system during at least one of factory calibration and radar system operation.

18. The method of claim 11, in which the reference receive channel and the receive channel are included in different radar transceiver integrated circuits in the radar system.

19. The method of claim 11, including:

filtering, by at least one first IQ matching filter, at least one of an in-band (I) and quadrature (Q) arm of the first digital IF signal to correct an IQ filter mismatch before processing of the first digital IF signal; and filtering, by at least one second IQ matching filter, at least one of an I and Q arm of the second digital IF signal to correct an IQ filter mismatch before processing of the second digital IF signal.

20. The method of claim 19, in which the at least one first and the at least one second digital IQ matching filters are real coefficient digital infinite impulse response (IIR) filters.

21. The radar system of claim 1, in which the reflected signal received by the reference receive channel is a delayed version of the reflected signal received at the receive channel.

22. The radar system of claim 1, in which the reflected signal received by the reference receive channel is an attenuated version of the reflected signal received at the receive channel.

23. The radar system of claim 1, in which the reflected signal received by the reference receive channel is a delayed and attenuated version of the reflected signal received at the receive channel.

24. The method of claim 11, in which the reflected signal received by the reference receive channel is a delayed version of the reflected signal received at the receive channel.

25. The method of claim 11, in which the reflected signal received by the reference receive channel is an attenuated version of the reflected signal received at the receive channel.

26. The method of claim 11, in which the reflected signal received by the reference receive channel is a delayed and attenuated version of the reflected signal received at the receive channel.

* * * * *